United States Patent [19]

Henmi

[11] Patent Number: 4,765,738

[45] Date of Patent: Aug. 23, 1988

[54] METHOD AND APPARATUS OF MEASURING FREQUENCY RESPONSE IN AN OPTICAL RECEIVING SYSTEM

[75] Inventor: Naoya Henmi, Tokyo, Japan

[73] Assignee: NEC Corporation, Tokyo, Japan

[21] Appl. No.: 1,451

[22] Filed: Jan. 8, 1987

[30] Foreign Application Priority Data

Jan. 8, 1986 [JP] Japan ................................. 61-2397

[51] Int. Cl.[4] .............................................. G01B 9/02
[52] U.S. Cl. .................................................. 356/349
[58] Field of Search .............................. 356/345, 349; 324/158 D

[56] References Cited

FOREIGN PATENT DOCUMENTS 2087545 5/1982 United Kingdom ................. 356/349

OTHER PUBLICATIONS

Kawanishi et al, "Measurement of High Frequency Response of Long Wavelength Optical Detector . . . ", National Conf. Record, 1985, Semiconductor Devices and Materials, Inst. of Electronics and Communication Engineers of Japan, Nov. 1985, pp. 1-191.

Kobayashi et al, "Direct Frequency Modulation in Al-GaAs Semiconductor Lasers", IEEE Journal of Quantum Electronics, vol. QE-18, No. 14, Apr. 1982, pp. 582, 595.

Kawasaki et al, "Biconical-Taper Single-Mode Fiber Coupler", Optics Letters, vol. 6, No. 7, Jul. 1981, pp. 327-328.

Fujita et al, "Single-Mode Fiber Coupler for Optical Heterodyne Detection", National Conf. Record, 1984, Inst. of Electronics and Communication Engineers of Japan, Mar. 1984, p. 1059.

Primary Examiner—Davis L. Willis
Assistant Examiner—Matthew W. Koren
Attorney, Agent, or Firm—Foley & Lardner, Schwartz, Jeffery, Schwaab, Mack, Blumenthal & Evans

[57] ABSTRACT

In method and apparatus of measuring frequency response in an optical receiving system, a laser light source produces a frequency-modulated laser light which is divided into the first and second lights. The first light is delayed through a longer optical path than that of the second light by a predetermined time, and thereafter the delayed first light and the second light or the original laser light are combined to produce combined light. The frequency response is measured in accordance with output power of beat signal converted from the combined light in regard to frequency of the beat signal.

8 Claims, 5 Drawing Sheets

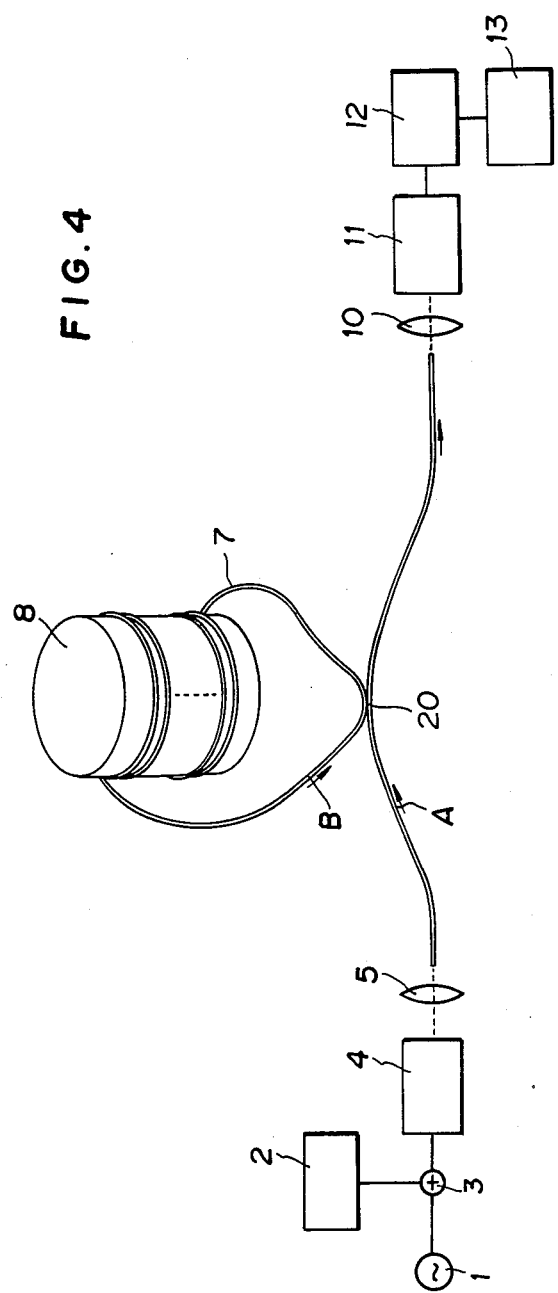

METHOD AND APPARATUS OF MEASURING FREQUENCY RESPONSE IN AN OPTICAL RECEIVING SYSTEM

FIELD OF THE INVENTION

The invention relates to method and apparatus of measuring the frequency response in an optical receiving system, and more particularly to a method and apparatus of measuring the frequency response in an optical receiving system in which laser light radiating from a laser light source including a single semiconductor laser is utilized in a heterodyne measuring process wherein no temperature control is necessary for the semiconductor laser in the laser light source.

BACKGROUND OF THE INVENTION

A conventional apparatus for measuring the frequency response in an optical receiving system comprises a light source from which an intensity-modulated light radiates and means demodulating the light to be received from the light source. In operation, the frequency response of a photodetector in an optical receiving system is measured in accordance with the demodulation of the intensity-modulated light.

Another conventional apparatus for measuring the frequency response in an optical receiving system is described in "Measurement of High Frequency Response of Long Wavelength Optical Detector using Optical Heterodyne Detection" by Satoki Kawanishi et al. on page 376 of "National Conference Record, 1985, Semiconductor Devices and Materials, the Institute of Electronics and Communication Engineers for Japan." The apparatus of measuring the frequency response in an optical receiving system comprises two semiconductor lasers from which laser lights having the wavelength of, for instance, 1.2886 μm and 1.2887 μm radiate, a half mirror combining the laser lights respectively focussed by lenses, a single mode optical fiber propagating the combined light, a photodetector receiving the light output from the optical fiber to produce an electrically converted beat signal, a spectrum analyzer measuring output power of the beat signal in regard to frequency thereof, and a peltier element cooling and heating one of the two semiconductor laser to control the beat frequency.

According to the apparatus for measuring the frequency response in an optical receiving system, the oscillation frequency of the semiconductor laser varies by 20 GHz with temperature change by 1° C., so that the frequency sweep can be performed by the temperature control thereof while the output light of the semiconductor laser is maintained constant. For this reason, the measurement of the frequency response can be performed with a higher precision.

In the former apparatus for measuring the frequency response in an optical receiving system, however, a disadvantage results in that the precise measurement of the frequency response is not achieved at the high frequency band of more than GHz since when a single laser is directly modulated, the intensity modulation is included in the frequency response characteristic in the measuring result of the photodetector.

In the latter apparatus for measuring the frequency response in an optical receiving system, there further results the disadvantages that the cost is increased for the reason that two semiconductor lasers having a single oscillation frequency must be comprised therein, and that the construction thereof is complicated for the reason that the temperature control of the semiconductor laser must be performed, for instance, by the peltier element.

SUMMARY OF THE INVENTION

Accordingly, it is an object of the invention to provide a method and apparatus for measuring the frequency response in an optical receiving system in which the frequency response thereof is measured with a high precision.

It is further object of the invention to provide a method and apparatus for measuring the frequency response in an optical receiving system in which laser light radiating from a single semiconductor laser is utilized in a heterodyne measuring process thereby to decrease the assembling cost thereof.

It is a still further object of the invention to provide a method and apparatus for measuring the frequency response in an optical receiving system in which no temperature control is necessary for a semiconductor laser in the laser light source thereby to simplify the construction thereof.

According to one feature of the invention, a method of measuring the frequency response in an optical receiving system comprises steps of, modulating an oscillation frequency in a laser light source, dividing laser light radiating from said laser light source into the first and second lights, delaying the first light in regard to the second light by a predetermined time, combining the delayed first light and the second light or said laser light to produce the combined light to be input to an optical receiving system, and measuring output power of the beat signal converted from the combined light in regard to frequency of said beat signal.

According to another feature of the invention, an apparatus for measuring the frequency response in an optical receiving system comprises, a laser light source in which the oscillation frequency is modulated to produce a frequency modulated laser light therefrom, means dividing said laser light radiating from said laser light source into the first and second lights, an optical fiber through which said first light is propagated to be delayed by a predetermined time in regard to said second light, means combining the delayed first light and said second light or said laser light to produce the combined light to be input to an optical receiving system, and means measuring output power of the beat signal converted from said combined light in regard to frequency of said beat signal.

BRIEF DESCRIPTION OF THE DRAWINGS

The invention will be explained in detail in accordance with the following drawings wherein, FIG. 4 is an explanatory view illustrating apparatus of measuring the frequency response in an optical receiving system in the second embodiment according to the invention.

DESCRIPTION OF THE PREFERRED EMBODIMENT

Figure 1:
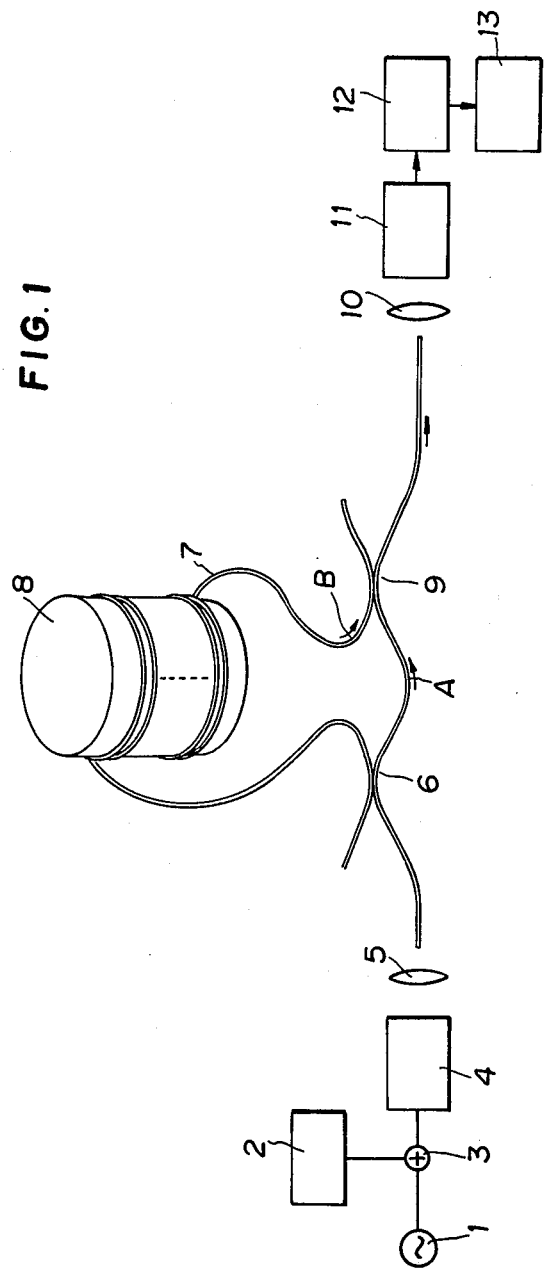
FIG. 1 is an explanatory view illustrating apparatus for measuring the frequency response in an optical receiving system in the first embodiment according to the invention.

In FIG. 1, there is shown the first embodiment of method and apparatus for measuring the frequency response in an optical receiving system according to the invention. The apparatus comprises a modulating signal source 1 from which modulating signal is produced, DC current source 2 from which DC current is generated, means 3 in which the DC current is modulated in accordance with the modulating signal, a semiconductor laser 4 from which laser light having the oscillation frequency depending on the modulated DC current radiates, a lens 5 focussing the laser light from the semiconductor laser 4, a fiber coupler 6 to one input terminal of which the laser light is coupled and from two output terminals of which a first and second light are output, a single mode optical fiber 7 connected to one of the output terminals of the fiber coupler 6 and wound on a drum 8, a fiber coupler 9 having two input terminals respectively connected to the remaining one of the output terminals of the fiber coupler 6 and to the end of the single mode optical fiber 7, a lens 10 focussing the laser light from the fiber coupler 9, a photodetector 11 receiving the laser light from the lens 10 to produce beat signal, an amplifier 12 amplifying the beat signal up to a predetermined level, and a spectrum analyzer 13 in which output power of the beat signal is measured depending upon frequency of the beat signal.

Figure 2:
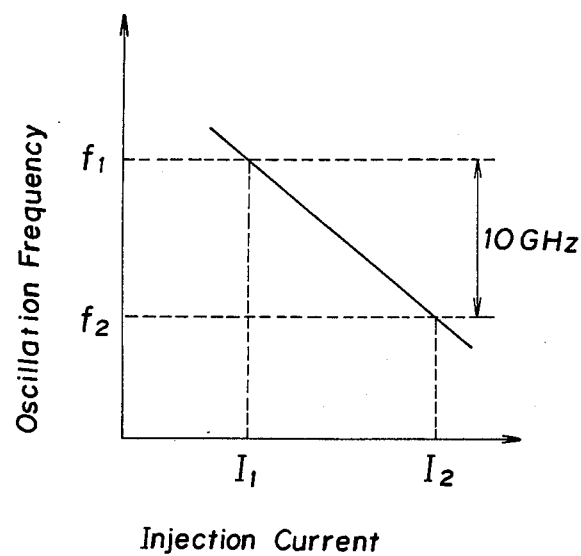
FIG. 2 is an explanatory chart showing the modulation of the oscillation frequency in a semiconductor laser for a laser light source.

FIG. 2 shows the relation in the semiconductor laser 4 between the level of injection current and the oscillation frequency wherein the oscillation frequency varies in the range from $f_1$ to $f_2$ (10 GHz) when the injection current changes from $I_1$ to $I_2$. Such a semiconductor laser is described in "Direct Frequency Modulation in AlGaAs Semiconductor Lasers" by Soichi Kobayashi et al. on pages 582 to 595 of "IEEE JOURNAL OR QUANTUM ELECTRONICS, VOL. QE-18, No. 4, APRIL 1982".

Further, the fiber couplers 6 and 9 are described in "Biconical-taper single-mode fiber coupler" by B. S. Kawasaki et al. on pages 327 and 328 of "July 1981, Vol 6, No. 7, OPTICS LETTERS".

Figure 3A:
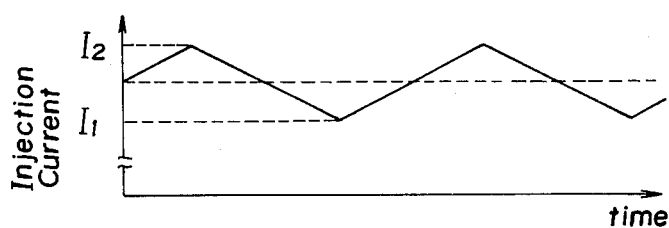
FIGS. 3A to 3D are time-charts showing the production of the beat signal in the first embodiment according to the invention.
Figure 3B:
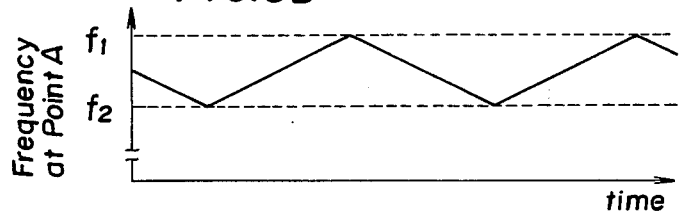
Figure 3C:
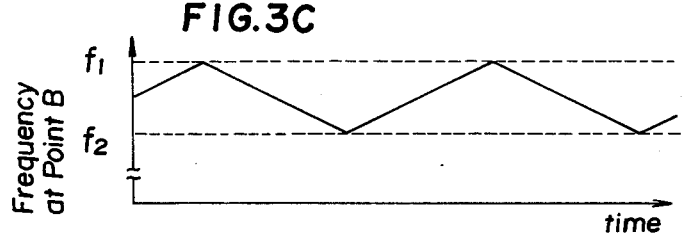

In operation, the DC current from the DC current source 2 is modulated as triangle wave in the means 3 in accordance with the modulating signal from the modulating signal source 1 as shown in FIG. 3A so that the oscillation frequency of the laser light radiating from the semiconductor laser 4 to be coupled through the lens 5 to the fiber coupler 6 varies as shown in FIG. 3B (for instance, at point A) in accordance with the relation between the oscillation frequency and the injection current as already explained in FIG. 2. In the embodiment, the period of the modulating triangle wave is selected to be twice the delay time of the single mode optical fiber 7 so that the laser light radiating from the end of the optical fiber 7 varies in its frequency as shown in FIG. 3C (for instance, at point B).

Figure 3D:
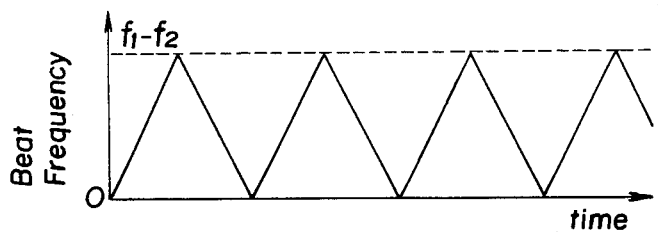

The first light passed through the point B and the second light passed through the point A are combined in the fiber coupler 9. The combined laser light is focussed by the lens 10 to be coupled to the photodetector 11 which produces the beat signal as shown in FIG. 3D. The beat signal is amplified up to a predetermined level in the amplifier 12 to be input to the spectrum analyzer 13. In the spectrum analyzer 13, the beat output having a frequency of the absolute value of the difference between the two frequencies $f_1$ and $f_2$ is obtained so that the characteristic of the frequency response is directly observed in the range from 0 to $(f_1 - f_2)$ Hz.

In the embodiment as described above, there is used DFB laser as the semiconductor laser 4 in which the oscillation of a single longitudinal mode is performed. In the modulation thereof, the wavelength is 1.5 $\mu$m while the threshold is 20 mA. The bias current supplied to the semiconductor laser 4 is to be sufficiently higher than the threshold level such that the degree of intensity modulation for the laser light is decreased whereby there is decreased the fluctuation of the beat powder due to the intensity modulation. For this purpose, the bias current of 100 mA, five times the threshold level thereof, is supplied from the DC current source 2 to the semiconductor laser 4. The modulating signal of 10 mA at peak to peak value is supplied from the modulating signal source 1 to cause variation of the oscillation frequency of the semiconductor laser 4 in the range of 10 GHz. As a result, the beat frequency $f_1 - f_2$ is about 10 GHz while the fluctuation of beat power due to the intensity modulation is decreased to less than 0.5 dB. Further, there is used a single mode optical fiber as the fiber 7 in which the total length thereof is 20 km and the loss thereof is 0.2 dB/km at the wavelength of 1.5 $\mu$m. The period of a triangle wave for modulating the oscillation frequency of the semiconductor laser 4 is selected to be of 200 $\mu$s two times the delayed time of 100 $\mu$s for the fiber 7 of 20 km. Still further, there is used a fiber coupler of a dividing ratio 3:2 as the fiber couplers 6 and 9. Such a fiber coupler is described in "Single-Mode fiber coupler for optical heterodyne detection" on page 1059 of "National Convention Record, 1984, the institute of Electronics and Communication Engineers of Japan". This is done so that the optical powers at the points A and B in FIG. 1 are made equal to maximize the output power of the beat signal when the optical current is constant. As a result, the loss of optical signal passing through the fiber 7 is compensated in accordance with the dividing ratio as mentioned above whereby the difference of laser lights between the points A and B is controlled to be approximately 0.5 dB.

Figure 5A:
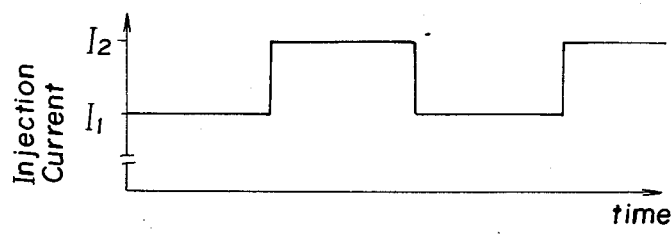
FIGS. 5A to 5D are time-charts showing the production of the beat signal in the second embodiment according to the invention.

In FIG. 4, there is shown the second embodiment of method and apparatus for measuring the frequency response in an optical receiving system according to the invention wherein like references indicate like parts as in FIG. 1. The apparatus in the second embodiment is different from the first embodiment in that a single fiber coupler 20 is used for dividing and combining laser lights and that the oscillation frequency of a semiconductor laser 4 is modulated by a square wave as shown in FIG. 5A. The period of the square wave is selected to be identical to that the triangle wave in the first embodiment.

Figure 5B:
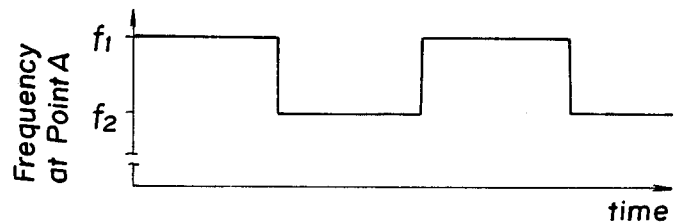
Figure 5C:
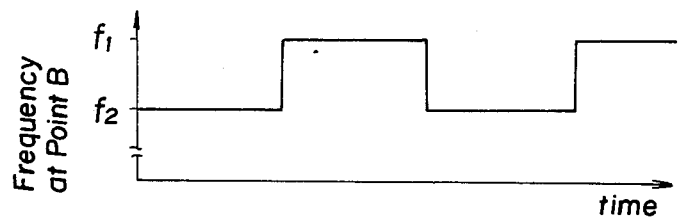
Figure 5D:
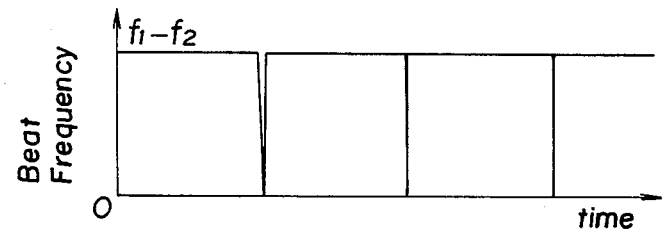

In operation, the injection current of 100 mA is supplied from the DC current source 2 while the square wave the amplitude of which ranges from 0 to 10 mA is supplied to modulate the semiconductor laser 4. The laser light radiating from the semiconductor laser 4 to be coupled through the lens 5 to the fiber coupler 20 varies in its oscillation frequency as shown in FIG. 5B (for instance, at point A) as explained in the first embodiment. The laser light is divided into the first and second lights by the fiber coupler 20 so that the first laser light is propagated through the fiber 7 wound on the drum 8. The laser light radiating from the end of the fiber 7 varies in its frequency as shown in FIG. 5C (for instance, at point B). The first laser light passed through the fiber 7 to be delayed and the original laser light passed through the point A are combined in the fiber coupler 20. As a result, the frequency of the combined light which is received by the photodetector 11 varies 0 to 10 GHz as shown in FIG. 5D. At this time, the fluctuation of output power of the signal is less than 0.5 dB.

In the first and second embodiments, the fiber coupler 2, 9 and 20 may be replaced by a beam splitter. Further, the frequency of modulating signal may be selected to be one half of an inverse number of the delayed time or to be an odd number times the frequency thus selected.

Although the invention has been described with respect to specific embodiments for complete and clear disclosure, the appended claims are not thus limited but are to be construed as embodying all modifications and alternative constructions that may occur to one skilled in the art which fairly fall within the basic teaching herein set forth.

What is claimed is:

1. A method for measuring a frequency response in an optical receiving system comprising steps of:
    controlling the current to be injected into a semiconductor laser,
    dividing laser light radiating from said semiconductor laser into two light beams,
    delaying one of said two beams relative to the other of said two light beams by a predetermined time,
    combining the delayed one of said two light beams and said other of said two light beams to produce combined light,
    inputting said combined light into an optical receiving system, and
    measuring output power of a beat signal converted from said combined light relative to frequency of said beat signal.

2. Method of measuring frequency response in an optical receiving system according to claim 1, wherein
    said step of controlling said current comprises modulating said injection current in accordance with one of a triangle and square wave.

3. Method of measuring frequency response in an optical receiving system according to claim 1, wherein
    said step of delaying comprises propagating said first light beam through a longer optical path than that of said second light.

4. Apparatus for measuring a frequency response in a optical receiving system comprising,
    a semiconductor laser into which a modulating current is injected for producing a laser oscillation frequency,
    means for dividing laser light radiating from said semiconductor laser into two light beams,
    an optical fiber through which one of said two light beams is propagated to be delayed by a predetermined time relative to the other of said two light beams,
    means for combining the delayed one of said two light beams and said other of said two light beams to produce combined light to be input into an optical receiving system, and
    means for measuring output power of a beat signal converted from said combined light relative to the frequency of said beat signal.

5. Apparatus of measuring a frequency response in an optical receiving system according to claim 4, further comprising means for producing said injected current in the form of a modulating signal of one of a triangle and square wave.

6. Apparatus of measuring frequency response in an optical receiving system according to claim 4, wherein
    said means for dividing said laser light is one of a fiber coupler and beam splitter.

7. Apparatus of measuring a frequency response in an optical receiving system according to claim 4, wherein
    said means for combining the delayed first light beam relative to said second light beam is one of a fiber coupler and beam splitter.

8. A method for measuring a frequency response in an optical receiving system comprising steps of,
    controlling the current to be injected into a semiconductor laser,
    dividing laser light radiating from said semiconductor laser into two light beams,
    delaying one of said two light beams relative to the other of said two light beams by a predetermined time,
    combining the delayed one of said two light beams and said other of said two light beams to produce combined light to be input to an optical receiving system, and
    measuring output power of a beat signal converted from said combined light relative to frequency of said beat signal,
    wherein said step of controlling the current comprises changing said current in accordance with a wave having a predetermined period so that said laser light radiating form said semiconductor laser is frequency modulated dependent on said wave.

* * * * *